(12) United States Patent
Zhou et al.

(10) Patent No.: US 7,635,150 B2
(45) Date of Patent: Dec. 22, 2009

(54) AUTOMOTIVE PRETENSIONER SEATBELT SYSTEM

(75) Inventors: Qing Zhou, Beijing (CN); Qi Liu, Beijing (CN)

(73) Assignee: Tsinghua University, Beijing (CN)

( * ) Notice: Subject to any disclaimer, the term of this patent is extended or adjusted under 35 U.S.C. 154(b) by 218 days.

(21) Appl. No.: 11/914,200

(22) PCT Filed: Apr. 10, 2006

(86) PCT No.: PCT/CN2006/000634

§ 371 (c)(1),
(2), (4) Date: Nov. 12, 2007

(87) PCT Pub. No.: WO2006/131041

PCT Pub. Date: Dec. 14, 2006

(65) Prior Publication Data

US 2008/0169634 A1    Jul. 17, 2008

(30) Foreign Application Priority Data

Jun. 9, 2005    (CN) .................. 2005 1 0011907

(51) Int. Cl.
*B60R 22/46* (2006.01)
*B60R 22/195* (2006.01)
*B60R 22/24* (2006.01)

(52) U.S. Cl. .................. 280/806; 280/808; 297/468
(58) Field of Classification Search .............. 280/806, 280/808; 297/468
See application file for complete search history.

(56) References Cited

U.S. PATENT DOCUMENTS

| 5,295,714 A | 3/1994 | Foehl |
| 5,346,152 A | 9/1994 | Foehl |
| 5,704,638 A | 1/1998 | Lane, Jr. |
| 6,460,935 B1 | 10/2002 | Rees et al. |

FOREIGN PATENT DOCUMENTS

| FR | 2494997 A1 | | 6/1982 |
| KR | 10-2003-0012256 | * | 2/2003 |

OTHER PUBLICATIONS

Wang JT, and Zhou Q, A Seat Belt Buckle Pretensioner and Load-Limiter Combo Device, 18th International Technical Conference on the Enhanced Safety of Vehicles, Paper No. 144, Nagoya, Japan, May 19-22, 2003.

* cited by examiner

*Primary Examiner*—Ruth Ilan
*Assistant Examiner*—Keith Frisby
(74) *Attorney, Agent, or Firm*—Michael Best & Friedrich LLP (57) ABSTRACT

The present invention provides an automotive pretensioner seatbelt system, which includes a seatbelt webbing, a slip ring, a buckle, a pretensioner and a retractor. One end of the webbing is fixed to the anchor site of the vehicle body, while the other end of the webbing goes through the slip ring and links to the retractor. The pretensioner includes a stroke enlargement mechanism and a power source. The stroke enlargement mechanism includes a fixed component and a movable component. The webbing is wound around the fixed component and the movable component. The stroke enlargement mechanism ensures that the length of webbing retracted by the pretensioner is greater than the displacement of the movable component. Compared to conventional seatbelt systems, this seatbelt system allows more webbing to be retracted in the same time duration; in other words, it takes less time to retract a webbing of the same length. In this way, pretension of the present invention can be realized more efficiently.

14 Claims, 8 Drawing Sheets

Fig. 17A  Fig. 17B

# AUTOMOTIVE PRETENSIONER SEATBELT SYSTEM

RELATED APPLICATION DATA

This application claims priority from China Patent Application No. 200510011907.9, filed on Jun. 9, 2005 and PCT Application No. PCT/CN2006/000634, filed Apr. 10, 2006, both of which are incorporated by reference herein.

TECHNICAL FIELD

The present invention relates to an automotive pretensioner seatbelt system and belongs to the automotive passive safety technology field.

BACKGROUND ART

Automotive seatbelt systems are of vital importance in occupant protection to reduce the injury severity of the occupant in the crash accidents by restraining the occupants to the seat when accidents occur.

Conventional seatbelts have limitations in occupant protection in the two following aspects:

First, for comfort, there is always some slack in the seatbelt webbing, especially when the clothes are thick. When an accident occurs, the webbing slack delays the time that the seatbelt provides restraint to the occupant and thus reduces its protection or effectiveness.

Second, when the seatbelt is tightened in a severe crash, the seatbelt load applied to the occupant could go beyond the occupant's injury tolerance and thus hurt the occupant.

Because of the limitations mentioned above, pretensioner seatbelts and load limiter seatbelts are more and more widely applied in recent years. In the early stage of a crash, the pretensioner reduces the slack of the seatbelt and lets the occupant into the constriction state as soon as possible; in the process of the crash, the load limiter controls the force applied to the occupants by the seatbelt to an acceptable level.

For pretensioner seatbelt systems, when a crash accident is detected, the pretensioner device is activated. There are several types of pretensioner devices. A popular explosion type of pretensioner device includes a gas initiator, a gas generator, a piston, a tube, a wire and a drive wheel. The piston is installed in the tube. One end of the wire is connected to the piston and the other end is connected with the drive wheel. When the pretensioner is activated, the gas initiator ignites the gas generator, causing the gas expansion and forcing the piston to pull the wire, which rotates the drive wheel. The webbing wound on the retractor driven by the wheel is retracted. At the end of the pretension process, the retractor locks and the seatbelt system restrains the occupants from hitting on the front panel or the steering wheel, etc.

In the existing seatbelt pretensioner designs, the pretensioning stroke distance is equal to the reduction of slack length of the webbing. Studies have confirmed that in crash accidents, if pretensioners can retract more webbing as soon as possible, the seatbelt system can actuate earlier and provide better protection.

The operation procedure of the load limiter seatbelt systems is as follows: when the load applied by the webbing to the occupants exceeds a certain level, the retractor or buckle will release some webbing under a preset load level to prevent an overly high load on the occupants. The main types of the load limiter are compressed deformation of metals, webbing unfolding, tearing deformation of side plate metals and torque deformation, etc.

While the use of pretensioners and load limiters could enhance the crash performance of a seatbelt system in some crashes, the use of both devices in a seatbelt system has not always been a practical choice due to some issues such as high cost, complicated structure and large space for packaging requirement.

SUMMARY OF THE INVENTION

In order to retract more webbing as soon as possible, the present invention provides an automotive pretensioner seatbelt system, which includes a stroke enlargement mechanism, comprising: a seatbelt webbing, a slip ring mounted to the outer side of the B-pillar inside the passenger compartment, and a retractor fixed in the B-pillar. One end of the webbing is fixed to the anchor of the vehicle body, while the other end of the webbing goes through the slip ring and links to the retractor. The automotive pretensioner seatbelt system is characterized by further comprising a pretensioner, which also is connected with the webbing between the slip ring and retractor. The pretensioner includes a stroke enlargement mechanism and a power source. The stroke enlargement mechanism comprises a fixed component and a movable component. The power source makes the movable component move when the seatbelt is actuated. The webbing is wound around both the fixed component and the movable component. The length of webbing retracted by the pretensioner is greater than the displacement of the movable component of the pretensioner driven by the power source. The movable component in the stroke enlargement mechanism will be locked by a locking mechanism when the pretension process ends.

A preferred embodiment of the invention is as follows. The fixed component is a fixed bracket fixed in the B-pillar while the movable component is a movable bracket. The fixed bracket and the movable bracket form a translational kinematic pair. The two brackets have a "ladder type" structure with a series of shafts mounted between the two side walls by bearings. The webbing is wound on the shafts on both of the fixed bracket and the movable bracket.

In order to obtain both the pretension and load limit functions in one structure, some improvements can be made based on the above embodiment. At least one groove can be provided in the side plates of the fixed component or the movable component. The shaft contacts with an open end of the groove. The width of the groove is a little smaller than the diameter of the shaft and the yield limit of the shaft is greater than that of the fixed component or the movable component.

The second preferred embodiment of the invention is as follows. The fixed component is a series of fixed shafts mounted in the B-pillar while the movable component is a movable bracket, which forms a translational kinematic pair with the shafts. The movable bracket has a "ladder type" structure with a series of shafts mounted between the two side plates by bearings. The webbing is wound on both the fixed shafts and the shafts of the movable bracket.

In order to obtain both the pretension and load limit functions in one structure, some improvements can be made based on the above embodiment. At least one groove is provided in the movable bracket. The shaft of the movable bracket contacts an open end of the groove. The width of the groove is a little smaller than the diameter of the shaft and the yield limit of the shaft is greater than that of the movable component.

The third preferred embodiment of the invention is as follows. The fixed component is one fixed shaft in the B-pillar while the movable component is a movable bracket. The movable bracket has a structure with one shaft mounted between the two side walls by bearings. The movable bracket forms a translational kinematic pair with the B-pillar. The webbing is wound around the fixed single shaft and the single shaft of the movable bracket.

In order to obtain both the pretension and load limit functions in one structure, some improvements can be made based on the above embodiment. A groove is provided in the movable bracket. The shaft of the movable bracket contacts an open end of the groove. The width of the groove is a little smaller than the diameter of the shaft and the yield limit of the shaft is greater than that of the movable bracket.

The fourth preferred embodiment of the invention is as follows: the fixed component of the stroke enlargement mechanism is a fixed bracket fixed in the B-pillar while the movable component is a movable bracket which moves along the B-pillar. The fixed bracket and the movable bracket form a translational kinematic pair. These two brackets have a structure with one shaft mounted between the two side walls by bearings. The webbing is wound on both the fixed single shaft of the fixed bracket and the single shaft of the movable bracket.

In order to obtain both the pretension and load limit functions in one structure, some improvements can be made based on the above embodiment. A groove is provided in the fixed component or the movable component. The shaft contacts an open end of the groove. The width of the groove is a little smaller than the diameter of the shaft and the yield limit of the shaft is greater than that of the fixed component or the movable component.

According to an embodiment of the present invention, the power source comprises a tube, a piston inside the tube, a gas initiator sealed in the tube and a wire connecting the movable component with the piston. The present invention can also use other types of the power sources known in the art as long as the power source can drive the movable component or the moveable bracket of the stroke enlargement mechanism.

The pretensioner of the invention further includes a locking mechanism. The movable component in the stroke enlargement mechanism will be locked by a locking mechanism when the pretension process ends.

A preferred locking mechanism is a spring-wedge locking mechanism which includes a lock sleeve fixed to the B-pillar and a wedge received in the sleeve and a spring, where one end of the spring is fixed to the bottom of the lock sleeve and the other end of the spring pushes the wedge into a wedge slot formed in the movable component. In this way, the movable component can only move along one direction.

Another preferred locking mechanism is a pawl-ratchet locking mechanism, which includes a pawl rotating around its own axis, a stopper fixed to the B-pillar and a spring connecting the pawl and the stopper. One side of the movable component is formed as a ratchet. The movable component can only move in one direction because of the pawl-ratchet locking mechanism.

In one embodiment of the invention, the middle of piston has a concaved conical shape, a series of balls provided therein, and a wedge angle is formed by the piston and the tube as a self-friction lock angle to achieve one-direction locking of the piston and one-direction locking of the movable component. Thus the structure of the locking mechanism is further simplified.

In one embodiment of the invention, the pretensioner is installed within the B-pillar.

This invention can achieve the following effects independently or by combination:

1. In the early stage of the crash accidents, retract the same length of webbing within a shorter time, or retract more webbing within the same time for pretension. Restrain the occupants as soon as possible to protect the occupants more effectively and to reduce the possibility and severity of the risk;

2. In the middle and late stage of the crash accidents, control the load applied by the webbing to the occupant to an acceptable level;

3. Achieve the function of both the pretensioner and the load limit in the stroke enlargement mechanism. The structure is simplified and compact.

DETAILED DESCRIPTION OF THE PREFERABLE EMBODIMENTS

Figure 1:
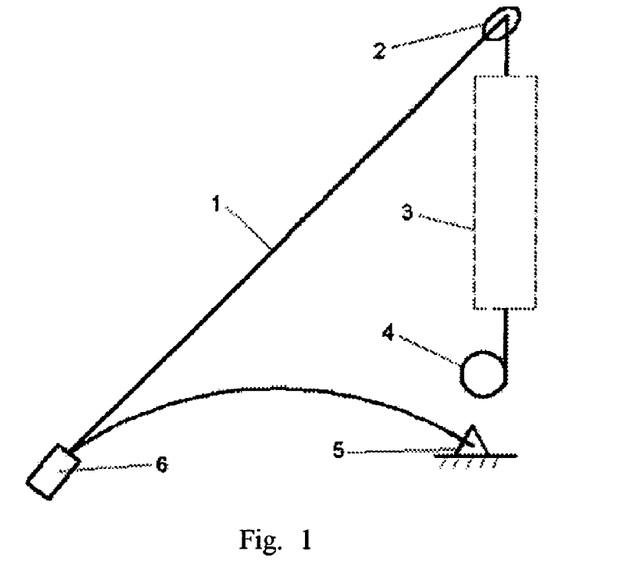
FIG. 1 is an overall schematic view showing the automotive pretensioner seatbelt system of the present invention.

The invention will now be described in detail with reference to the drawings. FIG. 1 shows the overall scheme of the automotive pretensioner seatbelt system. With respect to the driver's side for example, the automotive pretensioner seatbelt system with a stroke enlargement mechanism comprises the following: a seatbelt webbing 1, a slip ring 2 mounted to the outer side of the B-pillar inside the passenger compartment, a pretensioner 3 installed in the B-pillar and a retractor 4 fixed to the B-pillar. One end of the webbing 1 is fixed to the anchor site 5 of the vehicle body, while the other end of the webbing 1 goes through the slip ring 2 and links to the retractor 4. The pretensioner 3 is also linked with the webbing 1 between the slip ring 2 and the retractor 4. The webbing is linked to the vehicle body by a buckle 6.

In one embodiment of the invention, the pretensioner 3 comprises a stroke enlargement mechanism, a locking mechanism and a power source. The power source, i.e. explosive device, which drives the movable component of the stroke enlargement mechanism, can be installed in the B-pillar and will be described with reference to FIG. 14 and FIG. 15.

The stroke enlargement mechanism includes a fixed component and a movable component. The webbing 1 is wound about the shafts of both the fixed component and the movable component. The stroke enlargement mechanism is constructed such that the length of webbing 1 retracted by the pretensioner is greater than the displacement of the movable component driven by the power source. The movable component in the stroke enlargement mechanism will be locked in one direction by a locking mechanism when the pretension process ends.

Figure 2:
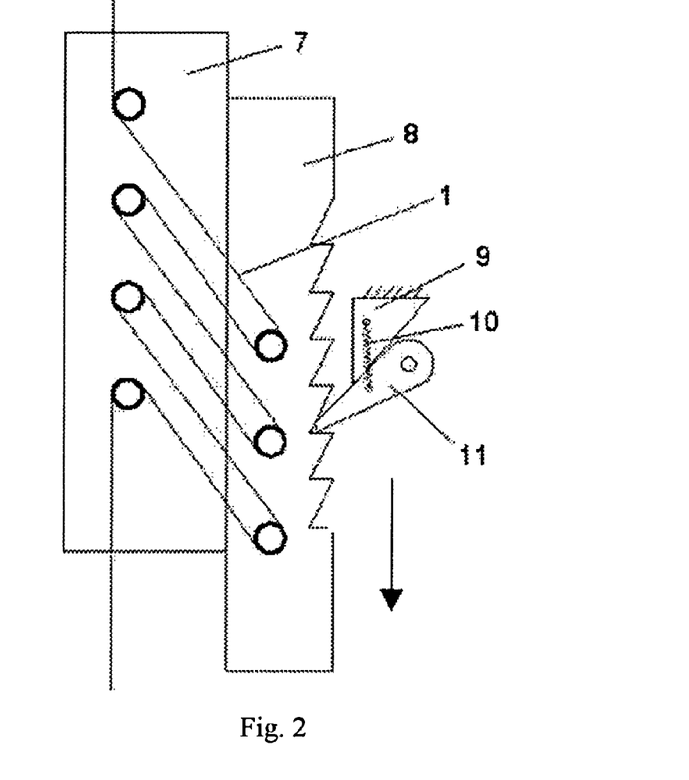
FIG. 2 is a schematic view showing the structure of the first embodiment of the pretensioner of the present invention.
Figure 3:
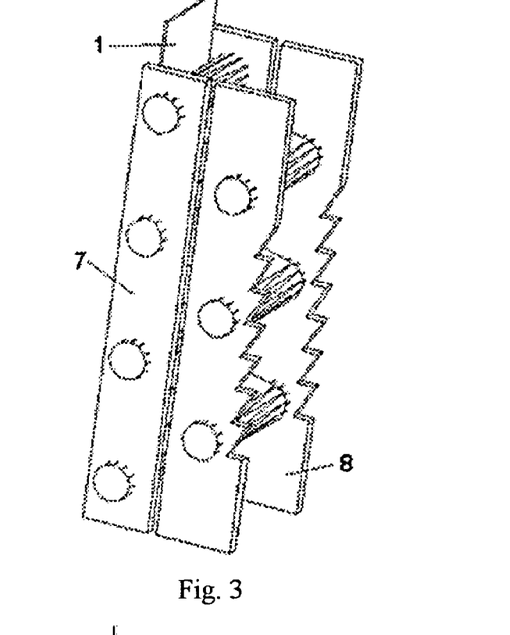
FIG. 3 is a perspective view showing the stroke enlargement mechanism in FIG. 2.
Figure 4:
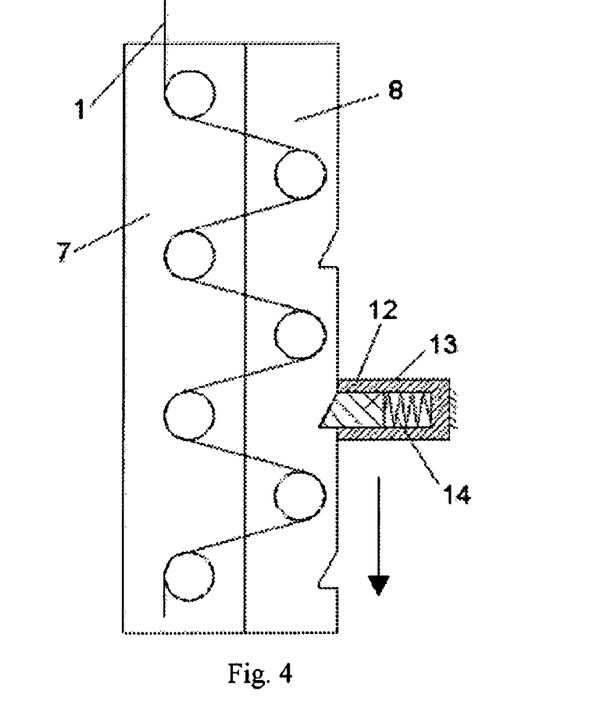
FIG. 4 is a schematic view showing the structure of the second embodiment of the pretensioner of the present invention.

FIG. 2 shows an embodiment of the pretensioner. The pretensioner comprises the "double brackets" stroke enlargement mechanism and the pawl-ratchet locking mechanism. The fixed component is a fixed bracket 7 fixed in the B-pillar while the movable component is a movable bracket 8. The fixed bracket 7 and the movable bracket 8 form a translational kinematic pair. The fixed bracket has "ladder type" structures with a series of shafts mounted between two side plates, and the moveable bracket 8 also has "ladder type" structures with a series of shafts mounted between two side plates, as shown in FIG. 3. The webbing 1 is twisted between the fixed bracket 7 and the movable bracket 8 by wrapping the shafts of the fixed bracket and the shafts of the movable bracket 8, as shown in FIG. 4. In order to reduce the friction, the shafts are installed between two side plates by ball bearings. The outer ring of the bearing is assembled with the hole of the side plate of the bracket and the inner ring is assembled with the shaft. The outer ring is fixed and the inner ring, together with the shaft rotates around its own axis.

The pawl-ratchet locking mechanism shown in FIG. 2 comprises a pawl 11 rotating around its own axis, a stopper 9 fixed to the B-pillar and a reset spring 10 connecting with the pawl 11 and the stopper 9. One side of the movable bracket 8 is formed as a ratchet. The movable ratchet 8 can only move in one direction because of the pawl-ratchet locking mechanism. The clockwise movement of the pawl 11 is blocked by the stopper 9, so the movable bracket 8 can only move along the direction of the arrow shown in the FIG. 2. The reset spring 10 limits the anti-clockwise movement of the pawl 11 to a certain range in order to prevent locking failure of the locking mechanism.

Figure 12:
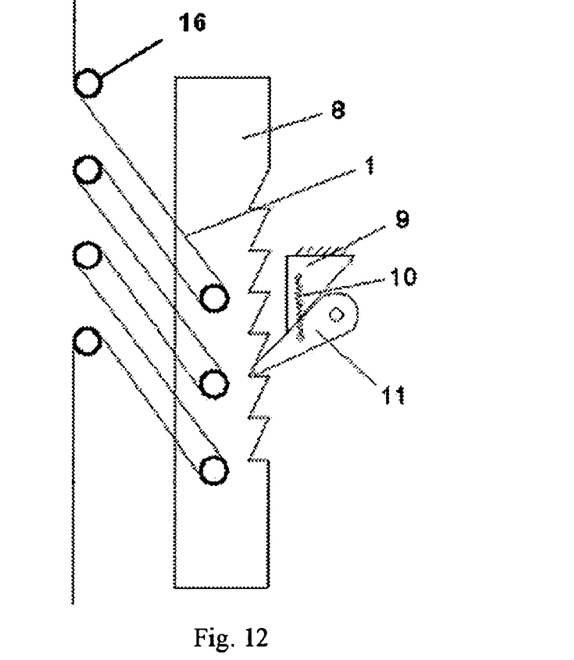
FIG. 12 is a schematic view showing the structure of another pretensioner of the present invention.

The design of the "double bracket" stroke enlargement mechanism can be modified while maintaining the same effect. For example, the shafts 16 can be installed directly to the B-pillar instead of being installed in the fixed bracket such that the side plates of the fixed bracket can be removed. The movable bracket 8 and the B-pillar form a translational kinematic pair, as shown in FIG. 12. In FIG. 12, the fixed component is a series of fixed shafts 16 in the B-pillar while the movable component is a movable bracket 8, which forms a translational kinematic pair with the shafts 16. The movable bracket 8 is a "ladder type" structure with a series of shafts mounted between two side plates. The shafts in the movable bracket 8 are installed in the side plates by bearings. The webbing 1 is wound about the fixed shafts 16 and the shafts of movable bracket 8.

The pretension process of this embodiment is as follows. When the seatbelt system is actuated, the lower end of the webbing 1 connected with the retractor 4 is fixed because of the locking of the retractor. The power source drives the movable bracket 8 to move along the direction of the arrow shown in FIG. 2, so the upper end of the webbing 1 retracts swiftly thus reducing the slack of the webbing 1 with high efficiency. When the pretension process ends, the locking mechanism actuates and maintains the retract status of the webbing, preventing the re-loosening of the webbing 1 because of the inertia movements of the occupants.

Figure 9:
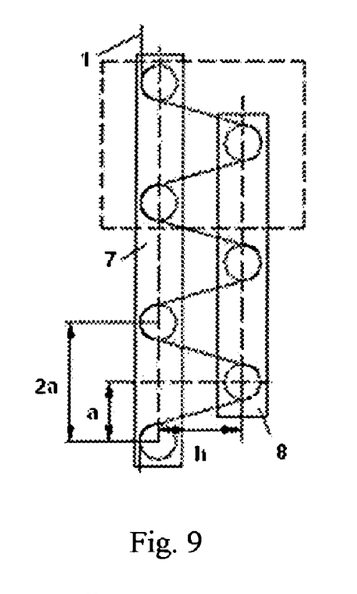
FIG. 9 and FIG. 10 are schematic views showing the operation principle of the "double bracket" stroke enlargement mechanism of the present invention.
Figure 10:
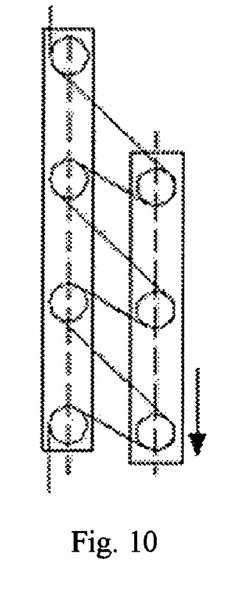

The operation principle of the "double bracket" stroke enlargement mechanism is described as follows:

As shown in FIG. 9, the vertical distance between two adjacent shafts in the same bracket is 2$a$ and the horizontal distance between the two brackets is h. The fixed bracket and the movable bracket form a translational kinematic pair. When in a position as shown in FIG. 9, where the vertical distance between two adjacent shafts in the different brackets is half of the distance 2$a$ of two adjacent shafts in the same bracket, the total length of the webbing between two brackets is the shortest, and this position is the initial position of the pretensioner. When the accident occurs and the seatbelt system is actuated, the lower end of the webbing 1 cannot move because of the locking of the retractor. When the power source drives the movable bracket 8 to move along the direction of the arrow shown in FIG. 10, the upper end of the webbing 1 retracts to reduce the slack of the webbing and the space between the webbing and the occupant such that the effect of pretension is achieved. The length change of the webbing between two brackets is used in the design of a stroke enlargement mechanism.

Figure 11:
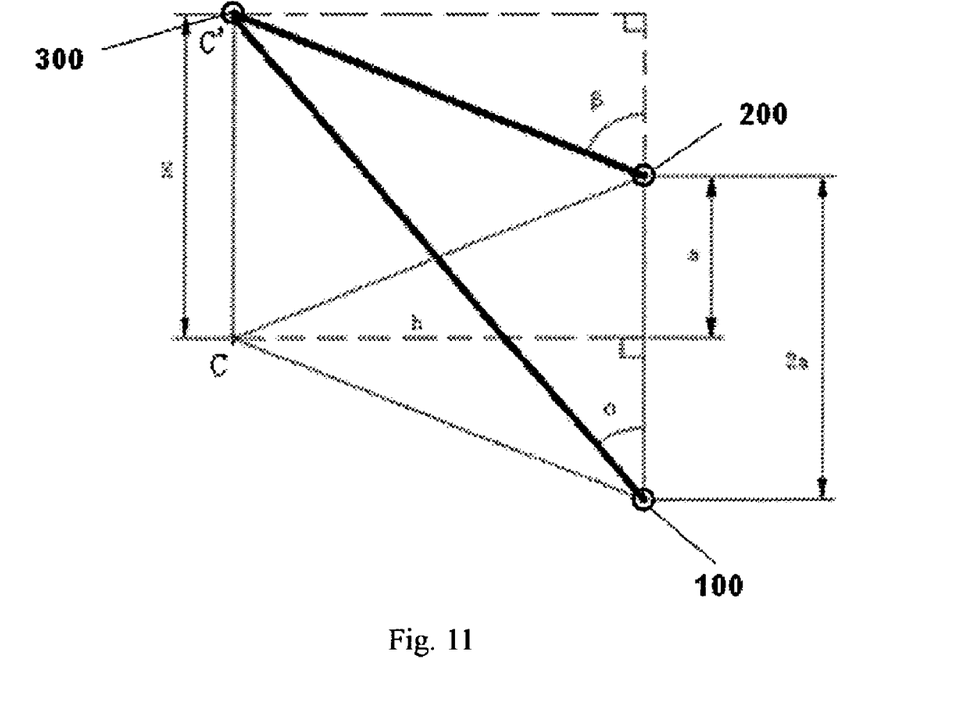
FIG. 11 is a schematic view showing the calculation of the enlargement factor of single stroke of the "double bracket" stroke enlargement mechanism of the present invention.

FIG. 11 shows the calculation of the enlargement factor of the "double bracket" stroke enlargement mechanism. The enlargement factor of the stroke enlargement mechanism is defined as the ratio of the retracting length of the webbing (Delta) divided by the displacement distance of the movable bracket driven by the power source. When the movable bracket 8 moves x from position C to C', in one stage (one stage is defined as an arrangement in the dashed line block, as shown in FIG. 9), the retracting length of the webbing (Delta) is calculated as follows:

$$\text{Delta} = \frac{h}{\sin\alpha} + \frac{h}{\sin\beta} - 2\sqrt{h^2 + a^2}$$

In which, $\alpha$ is the angle between the fixed bracket and the line, which connects the shaft 300 of the movable bracket and the shaft 100 of the fixed bracket; $\beta$ is the angle between the fixed bracket and the line, which connects the shaft 300 of the movable bracket and the adjacent shaft 200 of the fixed bracket.

$$\tan\alpha = \frac{h}{x+a}$$

$$\tan\beta = \begin{cases} \dfrac{h}{x-a} & x > a \\ \pi/2 & x = a \\ \dfrac{h}{x+a} & x < a \end{cases}$$

Note that the above calculations neglect the radius of the shaft.

The retracting length of the webbing (Delta) in one stage is calculated as above and the total retracting length can be calculated by Delta times the number of the stages. There are three main design parameters in the "double bracket" stroke enlargement mechanism: h, a and number of stages. It is obvious that the greater the number of stages, the greater the enlargement factor will be. Assuming that the movable bracket 8 moves 50 mm, table 1 lists the enlargement factor of the "double bracket" stroke enlargement mechanism under different combinations of h, a and number of stages.

TABLE 1

| h/mm | a/mm | number of stages | enlargement factor |
|------|------|------------------|--------------------|
| 40   | 25   | 3                | 2.2698             |
| 40   | 25   | 4                | 3.0264             |
| 40   | 30   | 3                | 2.0498             |
| 50   | 25   | 3                | 2.0542             |
| 50   | 25   | 4                | 2.7390             |

FIG. 4 shows the pretensioner comprising the "double brackets" stroke enlargement mechanism and the "spring-wedge" locking mechanism. Its principle and pretension operation process is similar to the embodiment shown in FIG. 2, but with a different locking mechanism. The "spring-wedge" locking mechanism comprises a lock sleeve 12 fixed to the B-pillar, a spring 14 with one end fixed to the bottom of the lock sleeve 12; the other end of the spring 14 pushes the wedge 13 into the wedge slot in the movable component. In this way, the movable component can only move along one direction. FIG. 4 shows the initial status of the locking mechanism when the pretensioner does not actuate. The spring is compressed, pushing the wedge 13 in the wedge slot of the movable bracket 8. When the pretensioner is actuated, the movable bracket 8 moves along the direction of the arrow shown in FIG. 4. Since there is a wedge angle, the force of the spring 14 is overcome and the movable bracket 8 moves downward. When the pretension process ends, the wedge 13 is pushed into another wedge slot in the movable bracket and the upward movement of the movable bracket is blocked, thus the reverse direction locking is achieved.

Figure 5:
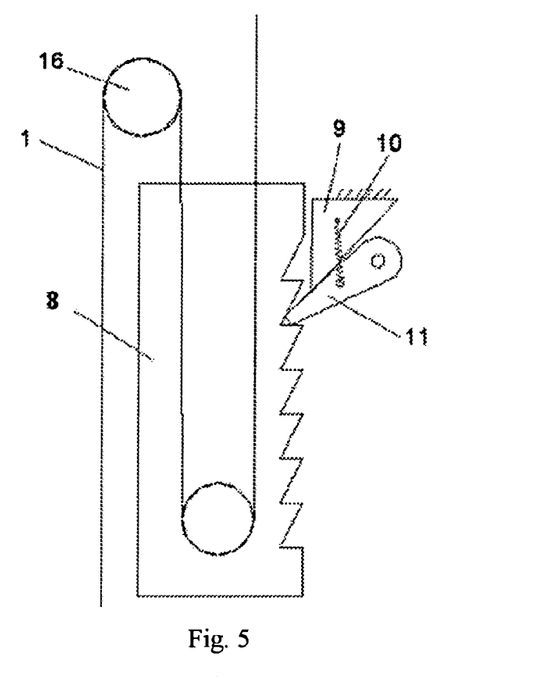
FIG. 5 is a schematic view showing the structure of the third embodiment of the pretensioner of the present invention.

FIG. 5 shows an embodiment of the pretensioner comprising the "movable pulley" stroke enlargement mechanism and the pawl-ratchet locking mechanism. In the "movable pulley" stroke enlargement mechanism, the fixed component is a fixed shaft 16 in the B-pillar while the movable component is a movable bracket 8. The movable bracket 8 has one shaft installed between two side plates and the movable bracket 8 forms a translational kinematic pair with the B-pillar. The shaft in the movable bracket 8 is installed between the two side plates by bearings. The webbing is wound about the fixed shaft 16 and the shaft of the movable bracket 8. In order to reduce the friction, the bearing is a rolling bearing, in which the outer ring of the bearing is assembled with the hole in the side plate of the bracket and the inner ring is assembled with the shaft. The outer ring is fixed and the inner ring, together with the shaft rotates around its own axis. The locking mechanism is the same as shown in FIG. 2. Correspondingly, a ratchet is formed in the side of the moveable bracket 8 which cooperates with the pawl-ratchet locking mechanism.

The operation principle of the "movable pulley" stroke enlargement mechanism is as follows. The movable bracket 8 and the B-pillar form a translational kinematic pair and the fixed shaft 16 is fixed to the B-pillar. The movable bracket 8 functions as a movable pulley. When the movable bracket 8 driven by the power source moves one unit along the direction of the arrow shown in FIG. 5, the length change of the webbing retracted is greater than one unit, two units at most.

Figure 13:
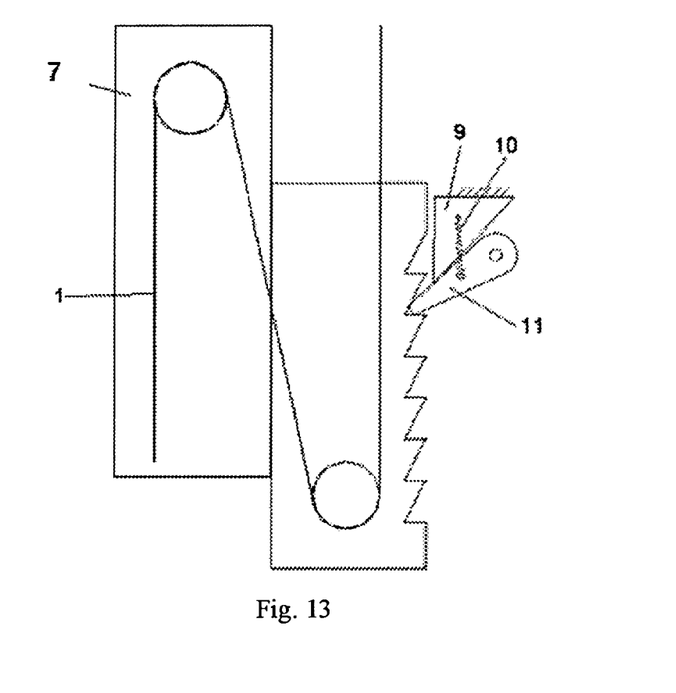
FIG. 13 is a schematic view showing the structure of further another pretensioner of the present invention.

The "movable pulley" stroke enlargement mechanism can be modified while maintaining the same effect, as shown in FIG. 13. The fixed component is a fixed bracket 7 fixed in the B-pillar while the movable component is a movable bracket 8. The fixed bracket 7 and the movable bracket 8 form a translational kinematic pair. These two brackets both have the same structure with one shaft between two side plates on the sides. The shaft is installed between the two side plates on the sides by bearings. The webbing 1 is wound about the shafts of the fixed bracket 7 and the movable bracket 8.

Figure 6:
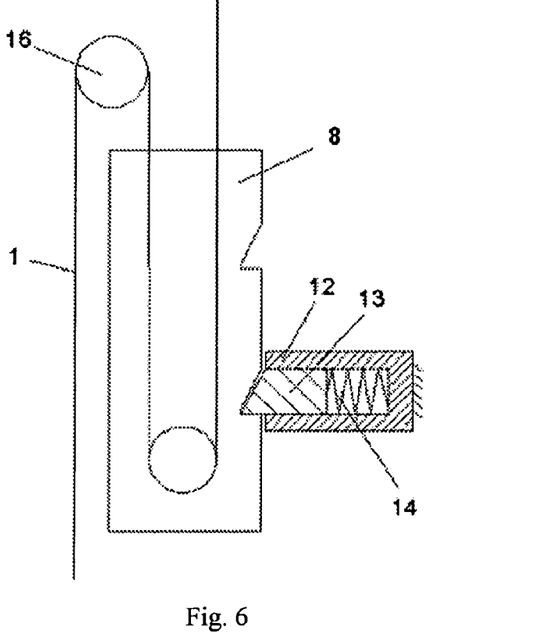
FIG. 6 is a schematic view showing the structure of the fourth embodiment of the pretensioner of the present invention.

FIG. 6 shows an embodiment of the pretensioner comprising the "movable pulley" stroke enlargement mechanism and the "spring-wedge" locking mechanism. Its operation principle and pretension process is similar to the embodiment shown in FIG. 5. The locking mechanism is the same as shown in FIG. 4. Some wedge slots are formed in the side of the moveable bracket 8 as the "spring-wedge" locking mechanism is used.

Figure 7:
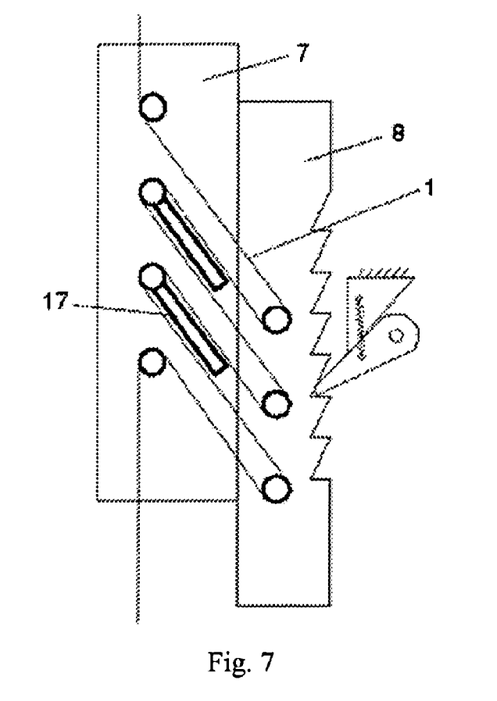
FIG. 7 is a schematic view showing the structure of the fifth embodiment of the pretensioner of the present invention.

FIG. 7 shows an embodiment of the pretensioner which achieves the function of the pretension and a function of load limit, which is modified from the embodiment shown in FIG. 2. In the "double bracket" stroke enlargement mechanism, at least one groove 17 is provided in the side plates of the fixed bracket 7. The open end of the groove 17 contacts the shaft. The width of the groove 17 is a little smaller than the diameter of the shaft, and the yield limit of the shaft is greater than that of the fixed bracket or the movable bracket. Alternatively, at least one groove 17 can also be provided on the side plates of the movable bracket 8 to achieve the function of load limiter.

The pretension operation process of the pretensioner having the above two functions is similar to the embodiment shown in FIG. 2. FIG. 7 shows the status of the pretensioner when the pretension operation process ends. The pawl-ratchet locking mechanism actuates and the movable bracket 8 is not allowed to move upwards. When the tension of the webbing exceeds a certain level, the shaft of the fixed bracket will be pushed toward the groove of the side plate, to cause plastic deformation of the side plate. In this pushing process, the tension of the webbing remains relatively constant. The lower end of the webbing is still fixed to the retractor which is locked after the accident occurs, but the upper end of the webbing is released because the shaft(s) is pushed into the groove of the side plates. In this way, an acceptable level of the load of tension of the webbing is maintained. The load limiter function is independent of the type of the locking mechanism. The present invention can also use another type of locking mechanism.

Figure 8:
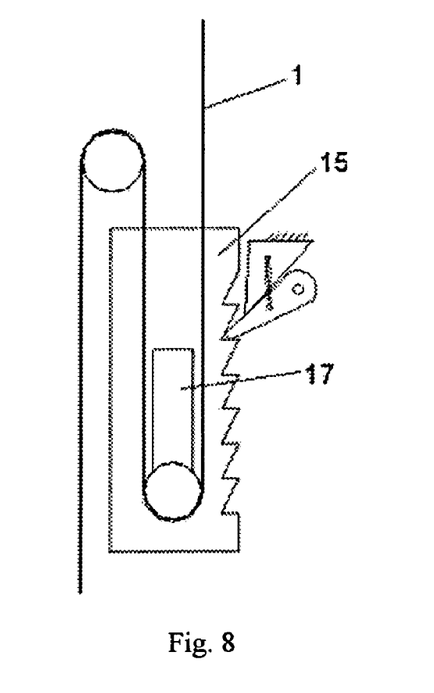
FIG. 8 is a schematic view showing the structure of the sixth embodiment of the pretensioner of the present invention.

FIG. 8 shows an embodiment of the pretensioner which achieves the function of the pretension and a function of load limit, which is modified from the embodiment shown in FIG. 5. A groove 17 is provided in a side plate of the movable bracket 8 of the "movable pulley" stroke enlargement mechanism. The open end of the groove contacts the shaft. The width of the groove 17 is a little smaller than the diameter of the shaft of the movable bracket 8 and the yield limit of the shaft is greater than that of the movable bracket 8. FIG. 8 shows the status of the pretensioner when the pretension process ends. The locking mechanism actuates and the movable bracket 8 is not allowed to move upwards. When the tension of the webbing exceeds certain level, the shaft of the movable bracket will be pushed toward the groove of the side plate to cause a plastic deformation of the side plate. In this pushing process, the tension of the webbing remains constant. The lower end of the webbing is still fixed to the retractor which is locked after the accident occurs, but the upper end of the webbing is released because the shaft is pushed into the groove of the side plates. In this way, an acceptable level of load of the tension of the webbing is maintained. The load limiter function is independent of the type of locking mechanism. Similarly, a groove 17 can also be formed in the two side plates as shown in FIG. 13.

FIG. 12 shows a modified structure based on the embodiment shown in FIG. 2. The fixed component is a series of fixed shafts 16 in the B-pillar while the movable component is a movable bracket 8, which forms a translation kinematic pair with the shafts 16. The movable bracket 8 has a "ladder type" structure with a series of shafts between two side plates on the sides. The shafts are installed in side plates by bearings. The webbing 1 alternatively winds around the fixed shafts 16 and the shafts of movable bracket 8.

Figure 14:
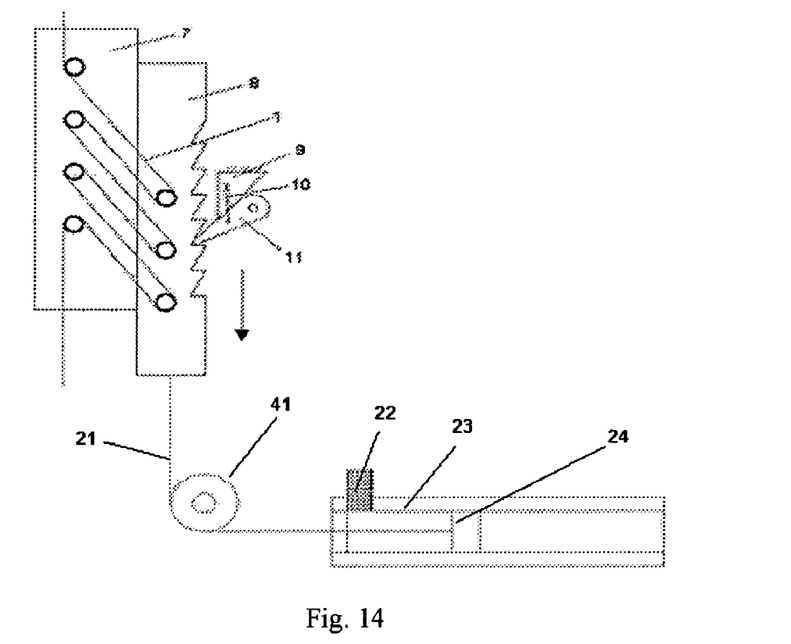
FIG. 14 is a schematic view showing the power source connecting with the movable component of the stroke enlargement mechanism of the present invention.
Figure 15:
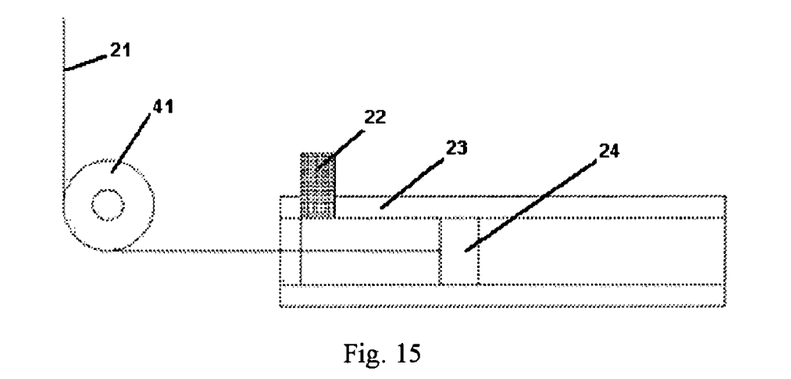
FIG. 15 is an enlarged view of FIG. 14 showing the power source.

FIG. 14 and FIG. 15 show an embodiment of the power source of the invention. The power source comprises a cylinder tube 23, a piston 24 inside the tube, and a gas initiator 22 (powder) sealed in the front of the tube 23. One end of the steel wire 21 is linked to the movable component 8 of the stroke enlargement mechanism and the other end is linked to the piston 24. A guide device 41 is provided between the movable component 8 and the tube 23 to make sure that the movable component moves along a predetermined direction of the arrow as shown in FIG. 14. When the accident occurs, the gas initiator explodes, the expanded gas forces the piston to pull the steel wire and the wire pulls the movable component of the stroke enlargement mechanism, thus retracting the webbing and reducing the slack.

Figure 16:
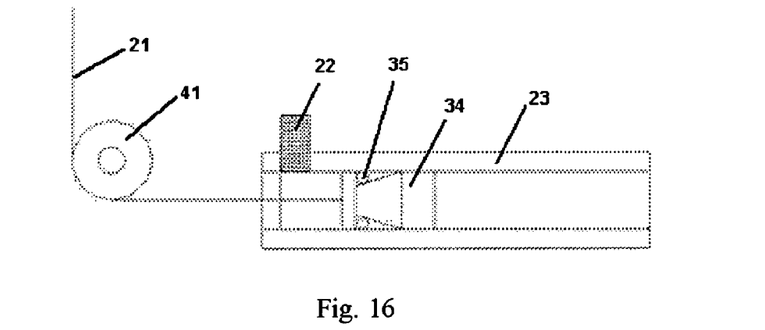
FIG. 16 is a schematic view showing a power source which has a self-lock mechanism.
Figure 17A:
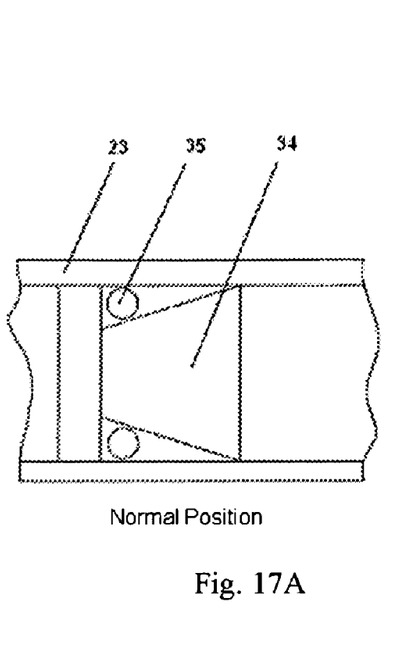
FIG. 17A is a schematic view showing the piston in the normal position and FIG. 17B is a schematic view showing the piston is in the locking position.
Figure 17B:
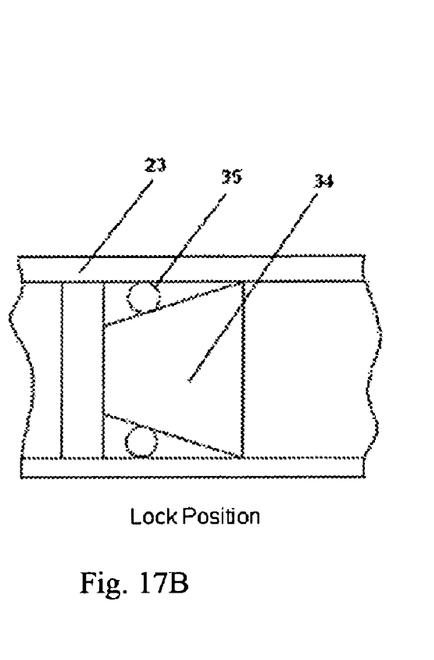

In accordance with another embodiment of the present invention, the pretensioner comprises a stroke enlargement mechanism and a power source. FIG. 16 and FIGS. 17A and 17B show another embodiment of the power source of the invention. The piston shown in FIG. 15 is modified to act as an additional load limiter. The piston 34 can be shaped as shown in FIG. 16 and FIGS. 17A and 17B. The middle of the piston has a conical shape, forming a self-locking wedge and allowing some steel balls 35 to sit in the gap of the piston 34 and tube 23. A wedge angle is formed by the piston and the tube as a self-friction lock angle to achieve one-direction locking of the piston and one-direction locking of the movable component. When this design is used, the other locking mechanism can be eliminated to simplify the structure. Note that the locking mechanisms are not limited to the ones mentioned above.

The invention is not limited to the embodiments mentioned above. A variety of other embodiments can be achieved based on the principle of the invention.

What is claimed is:

1. An automotive pretensioner seatbelt system, including a seatbelt, comprising: a seatbelt webbing, a slip ring mounted to the outer side of a B-pillar, a pretensioner installed within the B-pillar, and a retractor fixed in the B-pillar, wherein one end of the webbing is fixed to an anchor site of the vehicle body, while the other end of the webbing goes through the slip ring and the pretensioner, and links to the retractor, wherein the pretensioner is provided between the slip ring and the retractor, and the pretensioner comprising: a stroke enlargement mechanism and a power source, the stroke enlargement mechanism having a fixed bracket and a movable bracket, the power source making the movable bracket both move and have a displacement when the seatbelt is actuated, the seatbelt webbing is wound around the fixed bracket and the movable bracket, the length of the seatbelt webbing retracted by the stroke enlargement mechanism is greater than the displacement of the movable bracket driven by the power source wherein the fixed bracket is fixed in the B-pillar, the movable component is a movable bracket, the fixed bracket and the movable bracket form a translational kinematic pair, and both brackets have a ladder-type structure with a series of shafts mounted between two side plates by bearings.

2. The automotive pretensioner seatbelt system according to claim 1, wherein at least one groove having a width is provided in at least one of the fixed bracket and the movable bracket wherein the fixed bracket and the movable bracket each have a yield limit, an open end of the groove contacts a shaft of the series of shafts having a diameter and a yield limit, the width of the groove is smaller than the diameter of the shaft, and the yield limit of the shaft is greater than the yield limits of both the fixed bracket and the movable bracket.

3. The automotive pretensioner seatbelt system according to claim 1, wherein the power source comprises a tube, a piston inside the tube, a gas initiator sealed in the tube and a metal wire which connects the movable component and the piston.

4. The automotive pretensioner seatbelt system according to claim 1, wherein the pretensioner further comprises a locking mechanism, and wherein the movable component in the stroke enlargement mechanism will be locked by a locking mechanism.

5. The automotive pretensioner seatbelt system according to claim 4, wherein the locking mechanism is a spring-wedge locking mechanism, which includes a lock sleeve fixed to the B-pillar, a spring, a wedge, and a wedge slot formed in the movable component, wherein one end of the spring is fixed in the lock sleeve and the wedge is pushed into the wedge slot by another end of the spring such that the movable component can only move in one direction.

6. The automotive pretensioner seatbelt system according to claim 4, wherein the locking mechanism is a pawl-ratchet locking mechanism, which includes a pawl rotating around its own axis, a stopper fixed to the B-pillar and a reset spring connecting the pawl and the stopper, and wherein one side of the movable component is formed as a ratchet, and the movable component can only move in one direction because of the pawl-ratchet locking mechanism.

7. The automotive pretensioner seatbelt system according to claim 3, wherein the piston has a middle, and wherein the middle of the piston has both a concaved conical shape and a series of balls is provided between the middle of the piston and the tube, and wherein a wedge angle is formed by the piston and the tube as a self-friction lock angle to achieve one-direction locking of the piston and one-direction locking of the movable component.

8. An automotive pretensioner seatbelt system including a seatbelt, comprising: a seatbelt webbing, a slip ring mounted to the outer side of a B-pillar, a pretensioner installed within the B-pillar, and a retractor fixed in the B-pillar, wherein one end of the webbing is fixed to an anchor site of the vehicle body, while the other end of the webbing goes through the slip ring and the pretensioner and links to the retractor, wherein the pretensioner is provided between the slip ring and the retractor, and the pretensioner comprising: a stroke enlargement mechanism and a power source, the stroke enlargement mechanism having a fixed component and a movable component, the power source making the movable component move and have a displacement when the seatbelt is actuated, the seatbelt webbing is wound around the fixed component and the movable component, the length of the seatbelt webbing retracted by the stroke enlargement mechanism is greater than the displacement of the movable component driven by the power source, wherein the fixed component is a series of fixed shafts provided in the B-pillar, the movable component is a movable bracket, which forms a translational kinematic pair with the shafts, and the movable bracket has a ladder-type structure with a series of shafts mounted between two side plates by bearings.

9. The automotive pretensioner seatbelt system according to claim 8, wherein a groove having a width is provided in the movable bracket having a yield limit, an open end of the groove contacts the shaft having a diameter and a yield limit, the width of the groove is smaller than the diameter of the shaft, and the yield limit of the shaft is greater than the yield limit of the movable bracket.

10. The automotive pretensioner seatbelt system according to claim 8, wherein the power source comprises a tube, a piston inside the tube, a gas initiator sealed in the tube and a metal wire which connects the movable component and the piston.

11. The automotive pretensioner seatbelt system according to claim 8, wherein the pretensioner further comprises a locking mechanism, the movable component in the stroke enlargement mechanism being locked by the locking mechanism.

12. The automotive pretensioner seatbelt system according to claim 11, wherein the locking mechanism is a spring-wedge locking mechanism, which includes a lock sleeve fixed to the B-pillar, a spring, a wedge, and a wedge slot formed in the movable component, wherein one end of the spring is fixed in the lock sleeve and the wedge is pushed into the wedge slot by another end of the spring such that the movable component can only move in one direction.

13. The automotive pretensioner seatbelt system according to claim 11, wherein the locking mechanism is a pawl-ratchet locking mechanism, which includes a pawl rotating around its own axis, a stopper fixed to B-pillar and a reset spring connecting the pawl and the stopper, wherein one side of the movable component is formed as a ratchet, and the movable component can only move in one direction because of the pawl-ratchet locking mechanism.

14. The automotive pretensioner seatbelt system according to claim 10, wherein the middle of the piston has a concaved conical shape and a series of balls is provided between the middle of the piston and the tube, a wedge angle is formed by the piston and the tube as a self-friction lock angle to achieve one-direction locking of the piston and one-direction locking of the movable component.

* * * * *